United States Patent
Klotz, Jr. et al.

(10) Patent No.: US 8,615,757 B2
(45) Date of Patent: Dec. 24, 2013

(54) NEGOTIATED ASSIGNMENT OF RESOURCES TO A VIRTUAL MACHINE IN A MULTI-VIRTUAL MACHINE ENVIRONMENT

(75) Inventors: Carl G. Klotz, Jr., Beaverton, OR (US); Steve Grobman, El Dorado Hills, CA (US); Vedvyas Shanbhogue, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1393 days.

(21) Appl. No.: 11/964,660

(22) Filed: Dec. 26, 2007

(65) Prior Publication Data
US 2009/0172660 A1 Jul. 2, 2009

(51) Int. Cl.
*G06F 9/455* (2006.01)
*G06F 9/46* (2006.01)

(52) U.S. Cl.
USPC ............ 718/1; 718/100; 718/101; 718/102; 718/103; 718/104

(58) Field of Classification Search
None
See application file for complete search history.

(56) References Cited

U.S. PATENT DOCUMENTS

| | | | | |
|---|---|---|---|---|
| 4,916,608 | A * | 4/1990 | Shultz | 718/104 |
| 5,333,319 | A * | 7/1994 | Silen | 718/103 |
| 5,606,668 | A * | 2/1997 | Shwed | 726/13 |
| 6,092,110 | A * | 7/2000 | Maria et al. | 709/225 |
| 2006/0064697 | A1 * | 3/2006 | Kagi et al. | 718/103 |
| 2006/0136653 | A1 * | 6/2006 | Traut et al. | 711/6 |
| 2007/0079307 | A1 * | 4/2007 | Dhawan et al. | 718/1 |
| 2007/0283015 | A1 * | 12/2007 | Jackson et al. | 709/226 |
| 2008/0002739 | A1 * | 1/2008 | Droux et al. | 370/468 |

* cited by examiner

*Primary Examiner* — Emerson Puente
*Assistant Examiner* — Johnathan R Labud
(74) *Attorney, Agent, or Firm* — Trop, Pruner & Hu, P.C.

(57) ABSTRACT

A system and method are disclosed. In one embodiment the system includes a physical resource that is capable of generating I/O data. The system also includes multiple virtual machines to utilize the physical resource. Among the virtual machines are a resource source virtual machine that is capable of owning the physical resource. The resource source virtual machine is also capable of sending a stream of one or more I/O packets generated from the I/O data that targets a resource sink virtual machine. The resource sink virtual machine is designated as a termination endpoint of the I/O data from the physical device. Also among the virtual machines are one or more resource filter virtual machines. Each of the resource filter virtual machines is capable of filtering I/O packets of a particular type from the stream prior to the stream reaching the resource sink virtual machine.

21 Claims, 3 Drawing Sheets

NEGOTIATED ASSIGNMENT OF RESOURCES TO A VIRTUAL MACHINE IN A MULTI-VIRTUAL MACHINE ENVIRONMENT

FIELD OF THE INVENTION

The invention relates to the negotiation of the assignment of resources to a virtual machine.

BACKGROUND OF THE INVENTION

Virtualization software and hardware architecture have evolved to support the concept of "device remapping." This is the ability to take a physical device and map it to a dedicated virtual machine (VM) where the VM has complete control of the device. Optionally, the VM may offer the device's capabilities and services to other VMs, typically by implementing a device model that connects to virtual devices in other VMs. The ability to directly map a native device to a VM enables the VM to use the native capabilities of the device and interact with minimal possible overhead. "Virtual Appliance" models such as intrusion prevention or network isolation capabilities find it optimal to use this direct mapping architecture as it provides the opportunity to optimize performance and capabilities of the solution. Although direct mapping of devices works fine when a single appliance is installed on a computer platform, issues arise when multiple appliances are simultaneously installed and all wish to gain direct access to physical devices on the platform.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a system and method to negotiate the assignment of physical and virtual resources to a virtual machine in a multi-virtual machine environment are described. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
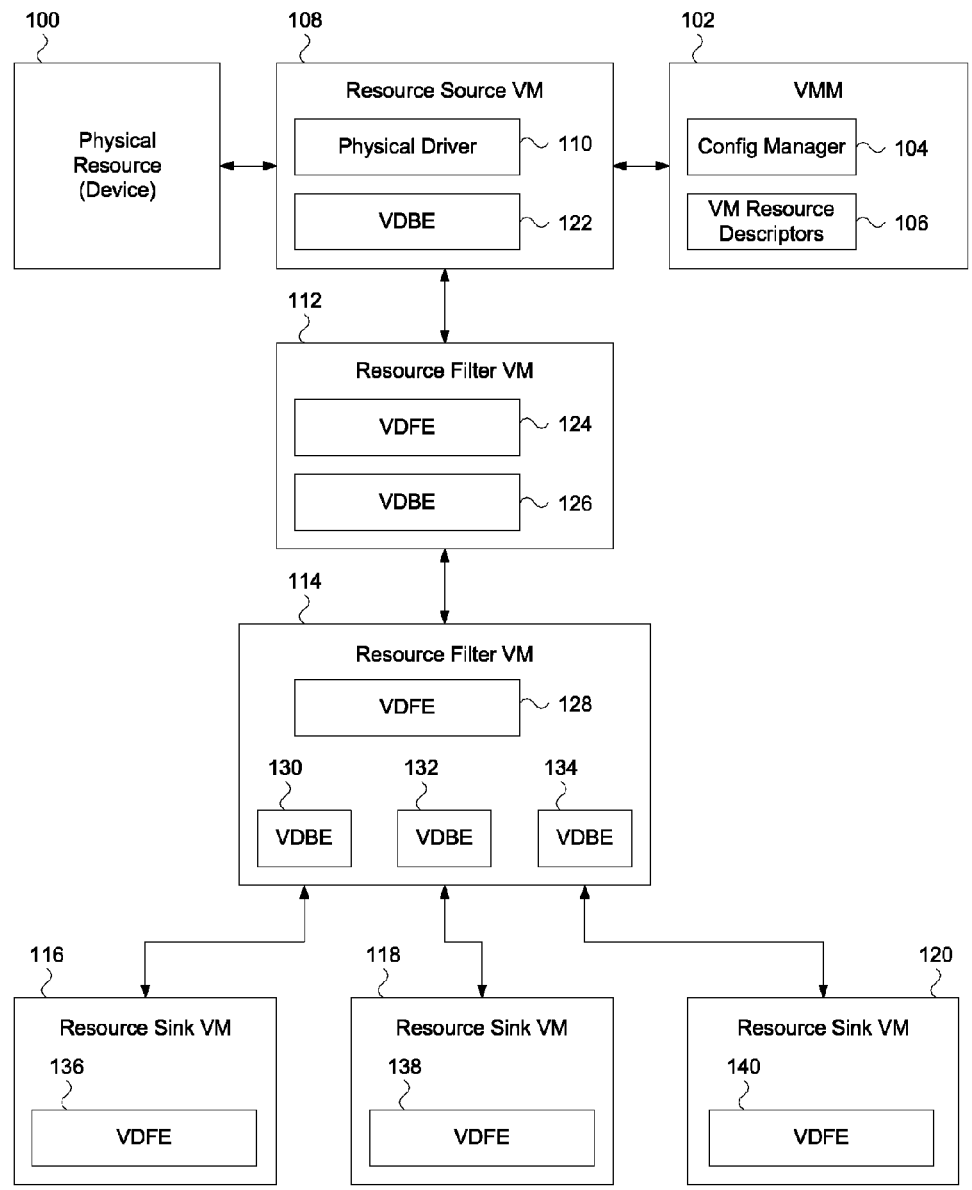
FIG. 1 describes a system that negotiates the assignment of physical and virtual resources to a virtual machine in a multi-virtual machine environment.

FIG. 1 describes a system that negotiates the assignment of physical and virtual resources to a virtual machine in a multi-virtual machine environment. In many embodiments, the system described in FIG. 1 resides on a computer platform such as a desktop computer, a laptop computer, a server, a handheld device, or any other type of known computer platform available. The computer platform includes components such as one or more central processing units and a memory subsystem. Additionally, the computer platform supports one or more types of hardware virtualization (e.g. Intel ® Virtualization Technology).

The computer platform includes a physical resource 100 (i.e. a device) that is virtualized among one or more virtual machines on the platform. In different embodiments, the device may be a network interface controller (NIC), an audio controller, or a graphics controller among other potential devices located on the computer platform.

In order to manage one or more virtual machines (VMs) on the virtualized computer platform, in many embodiments, the system includes a virtual machine manager (VMM) 102. VMM 102 includes a configuration manager 104 that provides boot and runtime device assignment to the one or more VMs. Thus, during the computer platform boot, device 100 is assigned to one or more VMs present in the system. A VM that is assigned device 100 is given partial or total ownership of the resource to manage during runtime. Additionally, the configuration manager also may be required to change the assignments of one or more devices during runtime for one of a number of reasons (e.g. a device is hot-plugged into the computer system, requiring assignment to one or more VMs during runtime).

The configuration manager additionally creates and configures a device topology for each platform resource. In other words, for any given device, such as device 100, one or more VMs resident within the computer platform may have requirements regarding the device. E.g. a virtual machine controlling a voice-over-Internet-protocol (VoIP) engine has certain requirements for a NIC device since the VoIP engine requires network traffic I/O (input/output).

In a computer platform that has multiple VMs, there may be more than one VM that has resource requirements for any one device. Thus, a device topology for a device may include a resource chain of assignments of that device to each VM with one or more resource requirements regarding the device. The resource chain for a given device links all VMs with one or more resource requirements regarding the device to the device itself. The configuration manager constructs the resource chain using a set of priority-based rules to resolve any potential resource conflicts among VMs for the device. Each VM that has at least one resource requirement for a device, such as device 100, provides the VMM 102 with a resource descriptor. The resource descriptor is a data structure that describes the VM's resource requirements for one or more devices on the computer platform. The resource descriptors provided to the VMM 102 are stored in the VMM's VM resource descriptors 106 and utilized by the configuration manager 104 at boot time and runtime to determine the resource requirements and VM type per device for every device in the computer platform.

FIG. 1 describes a three-type VM classification model per device. The configuration manager, at its discretion, can promote or demote a VM from one class of VM to another class to resolve conflicts regarding the device. The three types of VMs include a resource source VM, a resource filter VM, and a resource sink VM. Each type is described in detail below.

The resource source VM, such as resource source VM 108, owns the device I/O interface, in many embodiments. The VMM assigns the device 100 to the guest physical address space of the resource source VM. The guest physical address space is memory address space in the computer platform that is partitioned and reserved specifically for the resource source VM. The resource source VM 108 is responsible for enumerating device 100 (i.e. physical resource), loading the physical driver 110 for the device, configuring the device, and starting the device. The resource source VM is required to export a virtual device interface to any other VM in the computer platform that requests the services of the device. There is only one resource source VM for a given device.

The configuration manager within the VMM, through a negotiation protocol, determines whether a VM in the system is willing to provide virtual services regarding the device to other VMs. For example, to become the resource source VM, the VM in question must be able to provide a virtual interface to the device to any other VM in the system. This interface, called a virtual device back end (VDBE) interface, is discussed below. If the VM is not capable or willing to provide this interface, among any one or more other determined services, then the configuration manager must request another VM to be designated as the resource source VM. If the configuration manager has determined that there is no VM in the system which is willing or capable of being designated as the resource source VM, then the configuration manager may designate itself as the resource source VM and can provide these virtual services to other VMs. In a situation where a VM has agreed to provide the virtual services, but has failed to actually provide these virtual services, the configuration manager may remove the physical device from the control of the VM that is failing to provide the virtual services.

A resource filter VM examines and filters a specific device's I/O traffic. In many embodiments, there may be multiple resource filter VMs present for a given device (such as resource filter VMs 112 and 114 in FIG. 1). In other embodiments, there may be only one resource filter VM present (not pictured). In yet other embodiments, there may be no resource filter VMs present (not pictured). In many embodiments, the I/O traffic is in the form of a stream of I/O data packets. For example, in FIG. 1, any given I/O data packet may be either inbound from device 100 or outbound to device 100. In the inbound (from the device 100) situation, resource filter VMs 112 and 114 may filter one or more specific types of packets.

The specific filtering each resource filter VM performs can be any one or more conceivable filtering situations. For example, a resource filter VM may provide firewall services for other VMs in the computer platform receiving network traffic from device 100 (when device 100 is a NIC). In this example, packets may be filtered based on content, originating Internet protocol (IP) address, etc.

A resource filter VM may be promoted to a resource source VM if no resource source VM is installed in the computer platform. The configuration manager 104 may be able to make the determination as to whether a particular resource filter VM is capable and willing for promotion based on the resource descriptor provided to the VMM.

A resource sink VM, such as resource sink VMs 116, 118, and 120, is any VM that is an endpoint for the I/O traffic for a specific device. In the embodiment shown in FIG. 1, all inbound traffic from device 100 that is not filtered out of the stream by resource filter VMs 112 and 114 is terminated at the resource sink VM that the I/O traffic is targeting (this could be any of resource sink VMs 116, 118, or 120). In many embodiments, resource filter VMs 112 and 114 only filter traffic in the inbound stream from device 100. In these embodiments, all traffic (i.e. data packets) originating from resource sink VM 116, pass through resource filter VMs 112 and 114 and reach the physical driver 110 in resource source VM 108 (which, in turn, potentially sends the traffic to device 100). In other embodiments, resource filter VMs may also perform filtering operations on outbound traffic (from resource sink VM to device 100). Similar to promotions involving the resource source VM, if no VM in the computer platform is providing the role of the resource sink VM, the configuration manager may promote a resource filter VM that is capable and willing to take that role.

The device topology, such as the resource chain shown in FIG. 1, is not dependent on any particular boot order of the VMs in the chain. The topology is relative only to the device the chain was built for (in this case device 100). For any other device in the computer platform other than device 100, the resource chain may be entirely different as well as each VM taking on a different role. For example, VM 108 that has taken on the role of the resource source VM for device 100, may take on the role of the resource sink VM for another device in the computer platform.

In many embodiments, to create the resource chain, such as the chain shown in FIG. 1 (i.e. resource source VM is chained to resource filter VM 112, which is chained to resource filter VM 114, which is chained to resource sink VMs 116, 118, and 120), an inter-VM virtual driver model is utilized. Each VM in the chain includes a virtual driver that allows the VM to interact with adjacent VMs. In many embodiments, any given VM is adjacent to either one or two other VMs in the chain. This may be referred to as a serial chain since the VMs are chained in a series rather than in parallel. Thus, an inbound stream of data packets from device 100 first passes through resource source VM 108, then passes through resource filter VM 112, then passes through resource filter VM 114, and then reaches resource sink VM 116.

Every data packet in the stream (if not filtered by one of the resource filter VMs) will pass through each VM in this serial order. Thus, for each VM in the resource chain, the serially adjacent VMs are as follows: resource source VM 108 is serially adjacent to only resource filter VM 112, resource filter VM 112 is serially adjacent to resource source VM 108 and resource filter VM 114, resource filter VM 114 is serially adjacent to resource filter VM 112 and resource sink VMs 116-120, and each resource sink VM (116-120) is serially adjacent to resource filter VM 114.

The inter-VM virtual driver model allows for each serially adjacent pair of VMs in the resource chain to interact with each other (e.g. passing data packets in the stream between them). In many embodiments, the virtual driver on the resource source VM 108 interacts with the physical driver 110 to send and receive data packets to and from device 100. In some embodiments, the resource source VM 108 will packetize data it receives from the device 100. In other words, the physical driver 110 may provide data from the device 100 in one format and the resource source VM 108 may be required to format the data to send across the resource chain depending upon the requirements of one or more VMs within the resource chain.

Additionally, the virtual driver on the resource source VM 108 provides a virtual device back end (VDBE) interface 122 for a serially adjacent VM in the resource chain. The VDBE 122 is a virtual representation of the physical device interface that the physical driver 110 utilizes. Thus, resource filter VM 112, which is serially adjacent in the resource chain to resource source VM 108, interacts with the VDBE 122 as if it were the actual physical driver 110.

To effectively interact with VDBE 122, the virtual driver within resource filter VM 112 creates a virtual device front end (VDFE) interface 124. Thus, for any two serially adjacent VMs, the respective virtual drivers within each of the two VMs interact with each other using a VDBE-VDFE pairing. This VDBE-VDFE pairing is able to logically couple (i.e. link) two VMs together to allow data packets in the stream to pass between the two VMs. Thus, a VDBE in a VM closer to a device is logically coupled to a VDFE in a serially adjacent VM further from the device (e.g. VDBE 122 in resource source VM 108 is logically coupled to VDFE 124 in resource filter VM 112).

To complete the resource chain in FIG. 1, the virtual driver in resource filter VM 112 provides VDBE 126 to resource filter VM 114. The virtual driver in resource filter VM 114 provides VDFE 128 to resource filter VM 112 and provides three separate VDBEs (130, 132, and 134). Each of these three VDBEs is matched to one of the resource sink VMs (i.e. VDBE 130 is provided to resource sink VM 116, VDBE 132 is provided to resource sink VM 118, and VDBE 134 is provided to resource sink 120). Finally, the virtual driver in each of the three resource sink VMs provides a VDFE to resource filter VM 114 (i.e. resource sink VM 116 provides VDFE 136 to resource filter VM 114, resource sink VM 118 provides VDFE 138 to resource filter VM 114, and resource sink VM 120 provides VDFE 140 to resource filter VM 114).

Each resource sink VM only has a VDFE because each one is the end of a resource chain. Therefore, there is no additional VM to provide a virtual device interface.

In many embodiments, a priority level exists per VM regarding the device. In many embodiments, when the configuration manager is creating the resource chain, the VM with the highest priority for the physical resource (i.e. device) is given the role of the resource sink. Then, once the resource sink VM has been determined, the remaining VMs, apart from the VM that was designated as the resource source VM, are chained in the order of their priority level. Where the second highest priority VM is logically coupled to the resource sink VM, the third highest priority VM is logically coupled to the second highest priority VM and so on.

In many embodiments, there are multiple physical resources on the computer platform. For each physical resource, a resource source VM is designated, though, the resource source VM for a first physical resource may be any type of VM for a second resource. For example, for a first physical resource, a first VM may be designated as a resource source VM, for a second physical resource, the first VM may be designated as a resource sink VM, for a third physical resource, the first VM may be designated as a resource filter VM, and for a fourth physical resource, the first VM may not be associated at all with the fourth physical resource, so no designation applies. In many embodiments, the first VM may provide all of these different VM roles for these different physical resources simultaneously.

Figure 2:
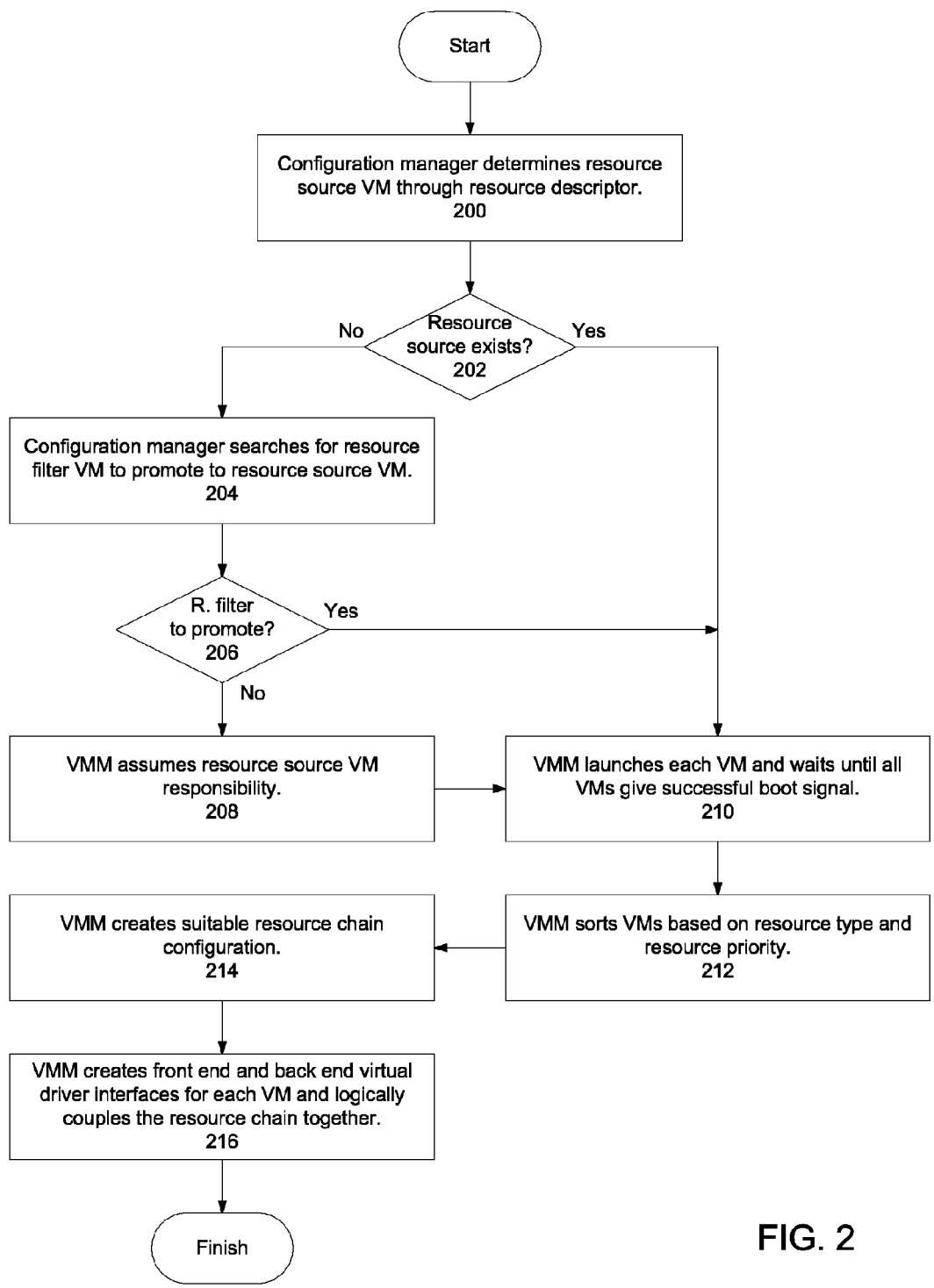
FIG. 2 is a flow diagram of one embodiment of a process to configure a virtual machine resource chain.

FIG. 2 is a flow diagram of one embodiment of a process to configure a virtual machine resource chain. The process is performed by processing logic that may be hardware, software, or a combination of both. Turning to FIG. 2, the process begins by processing logic within the configuration manager determining which of a group of VMs will be designated as the resource source VM through a resource descriptor provided by each VM (processing block 200).

Then processing logic determines whether a resource source VM exists for designation (processing block 202). If there is a designated resource source VM, then processing logic within the VMM launches each VM of the group of VMs and waits until all VMs in the group give a successful boot signal (processing block 204).

If there is no designated resource source VM, then processing logic within the configuration manager searches through any resource filter VMs within the group of VMs to determine if one is available to promote to the resource source VM (processing block 204). In many embodiments, processing logic utilizes the VM resource descriptors to determine whether there is a resource filter VM willing and capable of promotion.

Next, processing logic determines whether a resource filter VM has been found to promote (processing block 206). If a resource filter VM exists to promote, then processing logic proceeds to processing block 210 (described above). Otherwise, if a resource filter VM does not exist to promote, then the VMM assumes the resource source VM responsibility (processing block 208). In this situation the VMM is the only component in the computer platform that has the capability or is willing to be the resource source VM.

Then processing logic, once determining the resource source, performs processing block 210 as described above. Next, processing logic within the VMM sorts the VMs in the group according to resource type (i.e. source, filter, sink) and resource priority (processing block 212). Once all VMs in the group have been sorted, then processing logic within the VMM creates a suitable resource chain configuration (processing block 214) taking into account the priority levels of each VM as well as any potential resource conflicts.

Finally, processing logic within the VMM creates the front end and back end virtual driver interfaces for each VM (utilizing the inter-VM virtual driver model) and logically couples each serially adjacent VM pair together into the resource chain (processing block 216) and the process is finished.

Figure 3:
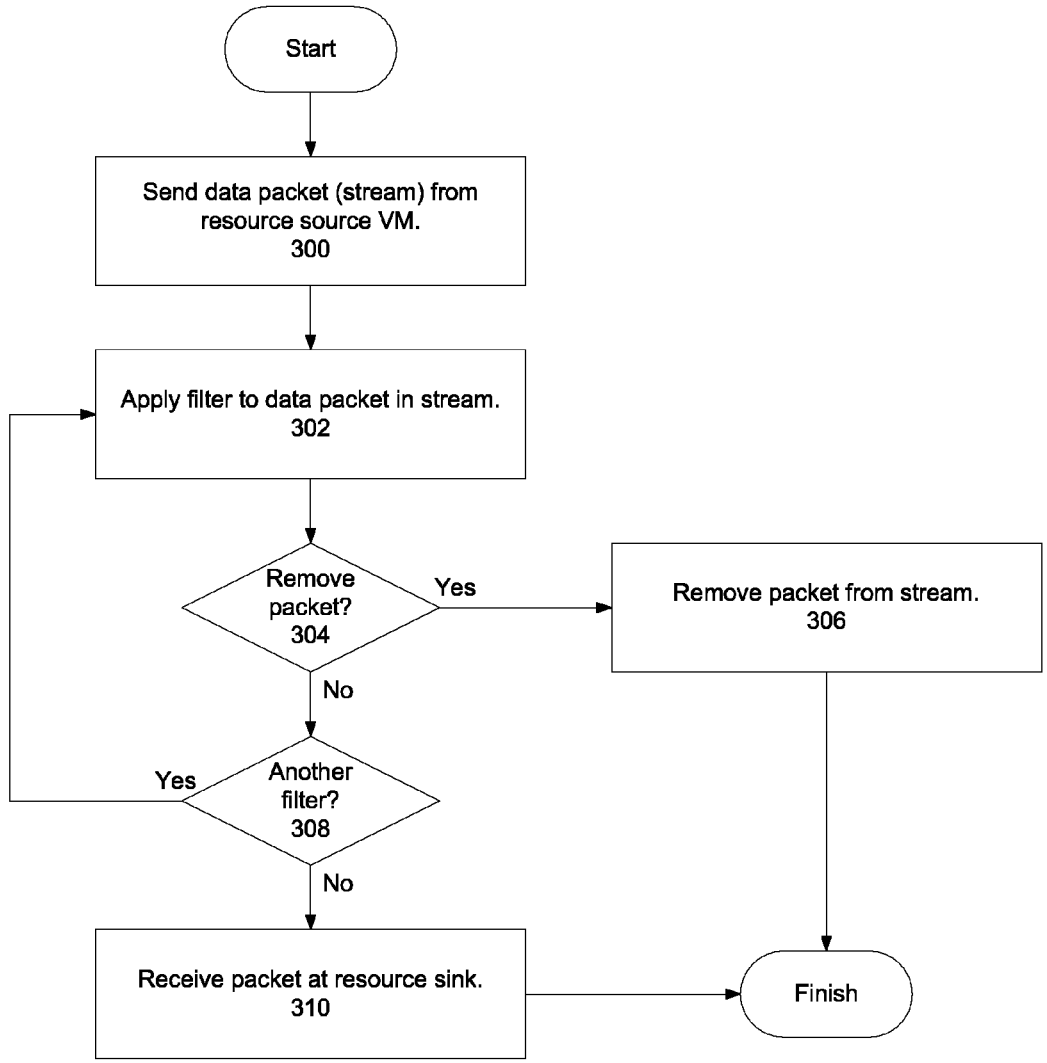
FIG. 3 is a flow diagram of a process to stream and potentially filter one or more packets from a resource source to a resource sink.

FIG. 3 is a flow diagram of a process to stream and potentially filter one or more packets from a resource source to a resource sink. The process is performed by processing logic that may hardware, software, or a combination of both. Turning to FIG. 3, the process begins by processing logic sending a data packet (as part of a stream) from a resource source VM (processing block 300). The data packet passes through a resource filter VM and processing logic within the resource filter VM applies its filter to the data packet (processing block 302).

Processing logic determines whether the filter removes the packet from the stream (processing block 304). If it is determined that the filter does remove the packet then processing logic physically removes the packet from the stream (processing block 306) and the process is finished. Otherwise, if it is determined that the filter does not remove the packet from the stream, then processing logic determines if the packet passes through another resource filter VM (processing block 308). If the packet does pass through another filter, then the process repeats starting at processing block 302. Otherwise, if the packet has no more resource filter VMs to pass through, then processing logic within the resource sink VM receives the packet (processing block 310) and the process is finished.

Thus, embodiments of a system and method to negotiate the assignment of physical and virtual resources to a virtual machine in a multi-virtual machine environment are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A system, comprising:
a physical resource to generate I/O data and a device topology; and
a plurality of virtual machines linked in a multi-virtual machine environment, the plurality of virtual machines to utilize the physical resource, wherein the plurality of virtual machines further comprises:
a resource source virtual machine to own the physical resource and send a stream of one or more I/O packets generated from the I/O data that targets a resource sink virtual machine;

the resource sink virtual machine to be designated an endpoint of the stream of I/O packets; and one or more resource filter virtual machines, each resource filter virtual machine to filter I/O packets of a particular type from the stream exchanged with the resource sink virtual machine, the physical resource, the resource source virtual machine, the resource sink virtual machine, and the plurality of resource filter virtual machines linked by a resource chain included in the device topology, the resource chain created according to an inter-virtual machine driver model and corresponding to an assignment of the physical resource to each of the plurality of virtual machines with one or more resource requirements regarding the physical resource.

2. The system of claim 1, further comprising:
a configuration manager to determine a set of resource requirements for each of the plurality of virtual machines regarding the physical resource; and
create the resource chain originating from the physical device to meet the set of resource requirements for each of the plurality of virtual machines.

3. The system of claim 2, wherein the set of resource requirements of each of the plurality of virtual machines is described in a resource descriptor, wherein each virtual machine of the plurality of virtual machines provides the configuration manager with a resource descriptor.

4. The system of claim 2, wherein the configuration manager is further operable to:
determine a resource priority level of each of the plurality of virtual machines;
sort the plurality of virtual machines in an order according to the resource priority level of each of the plurality of virtual machines; and
logically couple each of plurality of virtual machines in series in the sorted order to form the resource chain.

5. The system of claim 4, wherein the resource sink virtual machine has a highest priority level of the resource sink virtual machine, the resource source virtual machine, and the one or more resource filter virtual machines for the physical resource.

6. The system of claim 4, wherein the configuration manager is further operable to:
designate a virtual machine from the plurality of virtual machines with the highest resource priority level as the resource sink virtual machine;
determine whether another virtual machine within the plurality of virtual machines, apart from the resource sink virtual machine, agrees to provide a virtual interface of the physical resource to all of the one or more other virtual machines in the plurality of virtual machines; and
when another virtual machine has agreed to provide the physical interface of the physical resource, designate the determined virtual machine of the plurality of virtual machines as the resource source virtual machine, wherein the configuration manager designates itself to provide the virtual interface of the physical source when no virtual machine within the plurality has agreed to provide the physical interface of the physical resource.

7. The system of claim 6, wherein the configuration manager is further operable to:
remove the resource source designation from the determined virtual machine when the determined virtual machine fails to provide the virtual interface to the physical resource for one or more of the plurality of virtual machines.

8. The system of claim 6, wherein each virtual machine of the plurality of virtual machines includes a virtual driver, the virtual driver to provide a virtual device back end to a serially adjacent virtual machine in the resource chain that is further from the physical resource; and
provide a virtual device front end to a serially adjacent virtual machine in the resource chain that is closer to the physical resource, wherein a virtual device back end of a first virtual machine and a serially adjacent virtual device front end of a second virtual machine form a logically coupled link between the first and second virtual machines in the resource chain, the logically coupled link providing a path for one or more of the I/O packets to pass from the first virtual machine to the second virtual machine.

9. The system of claim 6, wherein the configuration manager is further operable to:
designate any additional virtual machines of the plurality of virtual machines that have not been designated as the resource sink virtual machine or the resource source virtual machine as a resource filter virtual machine.

10. The system of claim 1, further comprising one or more additional resource sink virtual machines, each of the one or more additional resource sink virtual machines being the target of one or more additional streams of I/O packets originating from the resource source virtual machine.

11. The system of claim 1, wherein the resource source virtual machine is to be a resource sink virtual machine for a second physical resource, and the resource sink virtual machine is to be a resource source virtual machine for the second physical resource.

12. A method, comprising:
generating one or more I/O packets from a physical resource having a device topology; and
exchanging the one or more generated I/O packets in a stream with a resource sink virtual machine;
filtering the stream of one or more I/O packets serially through each of one or more resource filter virtual machines, wherein each of the one or more resource filter virtual machines is designated to remove any I/O packets in the stream of a specific type, the resource sink virtual machine, and the one or more resource filter virtual machines linked by a resource chain, the resource chain included in the device topology, the resource chain created according to an inter-virtual machine driver model and corresponding to an assignment of the physical resource to each of a plurality of virtual machines including the resource sink virtual machine, and the one or more resource filter virtual machines with one or more resource requirements regarding the physical resource.

13. The method of claim 12, further comprising:
determining a set of resource requirements for each of the plurality of virtual machines regarding the physical resource; and
creating the resource chain originating from the physical device to meet the set of resource requirements for each of the plurality of virtual machines.

14. The method of claim 13, further comprising:
determining a resource priority level of each of the plurality of virtual machines;
sorting the plurality of virtual machines in an order according to the resource priority level of each of the plurality of virtual machines; and
logically coupling each of plurality of virtual machines in series in the sorted order to form the resource chain.

15. The method of claim 14, further comprising:
designating a virtual machine with the highest resource priority level as the resource sink virtual machine;
designating another virtual machine of the plurality of virtual machines, apart from the resource sink virtual machine, as the resource source virtual machine;
designating any additional virtual machines of the plurality of virtual machines that have not been designated as the resource sink virtual machine or the resource source virtual machine as a resource filter virtual machine.

16. The method of claim 15, further comprising:
providing a virtual device back end to a serially adjacent virtual machine in the resource chain that is further from the physical resource; and
providing a virtual device front end to a serially adjacent virtual machine in the resource chain that is closer to the physical resource, wherein a virtual device back end of a first virtual machine and a serially adjacent virtual device front end of a second virtual machine form a logically coupled link between the first and second virtual machines in the resource chain, the logically coupled link providing a path for one or more of the I/O packets to pass between the first virtual machine to the second virtual machine.

17. The method of claim 12, further comprising:
receiving each of the one or more I/O packets at a first resource filter virtual machine of a first priority level;
performing one or more filtering operations on each of the one or more received I/O packets at the first resource filter virtual machine, wherein when an I/O packet is filtered by one of the one or more filtering operations, the I/O packet is not sent to a next resource filter virtual machine or the resource sink virtual machine; and
passing each of the one or more I/O packets that are not filtered by the one or more filtering operations to a next resource filter virtual machine, or to the resource sink virtual machine when there are no additional resource filter virtual machines that have not yet received each of the one or more I/O packets.

18. The method of claim 12, further comprising designating the resource sink virtual machine to be a resource source virtual machine for a second physical resource, and designating the resource source virtual machine to be a resource sink virtual machine for the second physical resource.

19. A system, comprising:
a physical resource to generate I/O data;
a plurality of virtual machines to utilize the physical resource, wherein the plurality of virtual machines comprise:
a resource source virtual machine to own the physical resource and send a stream of one or more I/O packets generated from the I/O data that targets a resource sink virtual machine;
the resource sink virtual machine to be designated a termination endpoint of the stream of I/O packets; and
one or more resource filter virtual machines, each resource filter virtual machine to filter I/O packets of a particular type from the stream prior to the stream reaching the resource sink virtual machine; and
a configuration manager to create a resource chain, and designate a virtual machine from the plurality of virtual machines with the highest resource priority level as the resource sink virtual machine, and wherein each virtual machine of the plurality of virtual machines includes a virtual driver to provide a virtual device back end to a first adjacent virtual machine in the resource chain and to provide a virtual device front end to a second adjacent virtual machine in the resource chain.

20. The system of claim 19, wherein the resource sink virtual machine is a resource source virtual machine for a second physical resource, and the resource sink virtual machine is a resource source virtual machine for the second physical resource.

21. The system of claim 19, further comprising one or more additional resource sink virtual machines, each of the one or more additional resource sink virtual machines being the target of one or more additional streams of I/O packets originating from the resource source virtual machine.

* * * * *